(12) United States Patent
Ouellette (10) Patent No.: US 10,532,270 B2
(45) Date of Patent: Jan. 14, 2020

(54) VENTED SKI WITH MODIFIED KEEL

(71) Applicant: Michael J. Ouellette, Caribou, ME (US)

(72) Inventor: Michael J. Ouellette, Caribou, ME (US)

(*) Notice: Subject to any disclaimer, the term of this patent is extended or adjusted under 35 U.S.C. 154(b) by 0 days.

(21) Appl. No.: 16/214,738

(22) Filed: Dec. 10, 2018

(65) Prior Publication Data

US 2019/0176016 A1    Jun. 13, 2019

Related U.S. Application Data

(60) Provisional application No. 62/597,081, filed on Dec. 11, 2017.

(51) Int. Cl.
*A63C 5/04* (2006.01)
*B62M 27/02* (2006.01)

(52) U.S. Cl.
CPC .......... *A63C 5/0428* (2013.01); *A63C 5/0417* (2013.01); *B62M 2027/025* (2013.01)

(58) Field of Classification Search
CPC ....... A63C 5/0428; A63C 5/0417; A63C 5/04; A63C 5/0405; A63C 5/0422; A63C 5/044; B62M 2027/025
USPC ....................................... 280/609, 608, 11.18
See application file for complete search history.

(56) References Cited

U.S. PATENT DOCUMENTS

| | | | |
|---|---|---|---|
| 7,389,995 B2* | 6/2008 | Lemieux | B62B 17/02 280/21.1 |
| 7,500,679 B2* | 3/2009 | Wade | B62B 17/02 280/26 |
| 7,789,400 B2* | 9/2010 | Lachance | B62B 17/02 280/28 |
| 8,459,663 B2* | 6/2013 | Pryputniewicz | B62B 17/02 280/28 |
| 2003/0024751 A1* | 2/2003 | Lebreux | B62K 21/00 180/182 |

* cited by examiner

*Primary Examiner* — John D Walters
(74) *Attorney, Agent, or Firm* — Jeffrey Joyce, Esq.

(57) ABSTRACT

A ski having vents for venting snow from beneath the ski to a location above the ski and a modified keel that provides for greater and easier directional control over the ski relative to a conventional ski.

15 Claims, 11 Drawing Sheets

VENTED SKI WITH MODIFIED KEEL

BACKGROUND INFORMATION

Field of the Invention

The invention relates to skis, particularly those used to travel on snow and attached to ski-mounted vehicles such as snowmobiles.

Discussion of Prior Art

Snow skis are used by individuals and machines to move, or glide, across a snowy surface. Snowmobiles, in particular, are ski-mounted vehicles that are constructed to travel across snow and ice. As is generally known, the snowmobile is driven by an endless drive track arranged at the rear end of the underside of the snowmobile. The front end of the snowmobile is customarily supported on two skis, which glide across the surface of the snow or ice. The skis typically have a carbide runner or runners and a keel that run along a substantial portion of the bottom surfaces, to help keep the snowmobile traveling along a smooth track and to help steer.

The conventional keel runs nearly the entire length of the ski, being generally flat with a slight tapper on the front end, and typically has a depth of about one inch. While the exact dimensions of the conventional ski varies based on a number of factors, it is common for a ski to be approximately 45 inches in length with a keel that is approximately 42 inches in length. While the runners and keel generally help to control the snowmobile, in certain situations snow may become impacted beneath the ski and cause the ski to lift off the surface, thereby causing a loss in the ability to steer and control the snowmobile. Some skis are designed to compensate for this by having a much deeper keel, some having a depth of around 4 inches and that run nearly the entire length of the ski. However, while these deeper keels maintain contact with snow they are extremely difficult to maneuver, requiring a great deal of strength and an often an uncomfortable motion to change the direction of the snowmobile.

What is needed, therefore, is a ski that is designed to prevent snow from becoming impacted beneath the ski. What is further needed is a ski that enables greater control without requiring a greater degree of effort.

BRIEF SUMMARY OF THE INVENTION

The invention is a vented ski having one or more vents and modified keel that prevents snow from becoming impacted beneath the ski and enables greater and easier control over the ski. The vented ski with modified keel is particularly advantageous when used on a ski-mounted vehicle such as a snowmobile.

The one or more vents may be inserted into openings in the ski body, typically on either side of the keel and near a mid-point length-wise in the ski body. The vents are typically closed on a top surface and at least one side in a manner that directs snow away from the ski. As the ski travels across the snow, snow that normally may become impacted under the ski passes through the opening and out through the vent. The closed sides of the vent may be largely straight such that snow is directed straight off the back of the vent, or, alternatively, the sides may be opened or directional guides provided in order to direct the snow out and away from the snowmobile or inwards towards the snowmobiles track.

The modified keel is a short but deep keel, measuring less than 16 inches in length, preferably approximately 12 inches in length, and potentially as little as 4 inches to 6 inches in length. The keel generally has a depth of approximately 2 inches to approximately 4 inches, but may be shorter or deeper for certain purposes.

Together, the vents and modified keel create a ski having improved connection to a snowy surface while also allowing an operator to easily change direction and control the overall movement of the ski-mounted vehicle in a variety of conditions.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
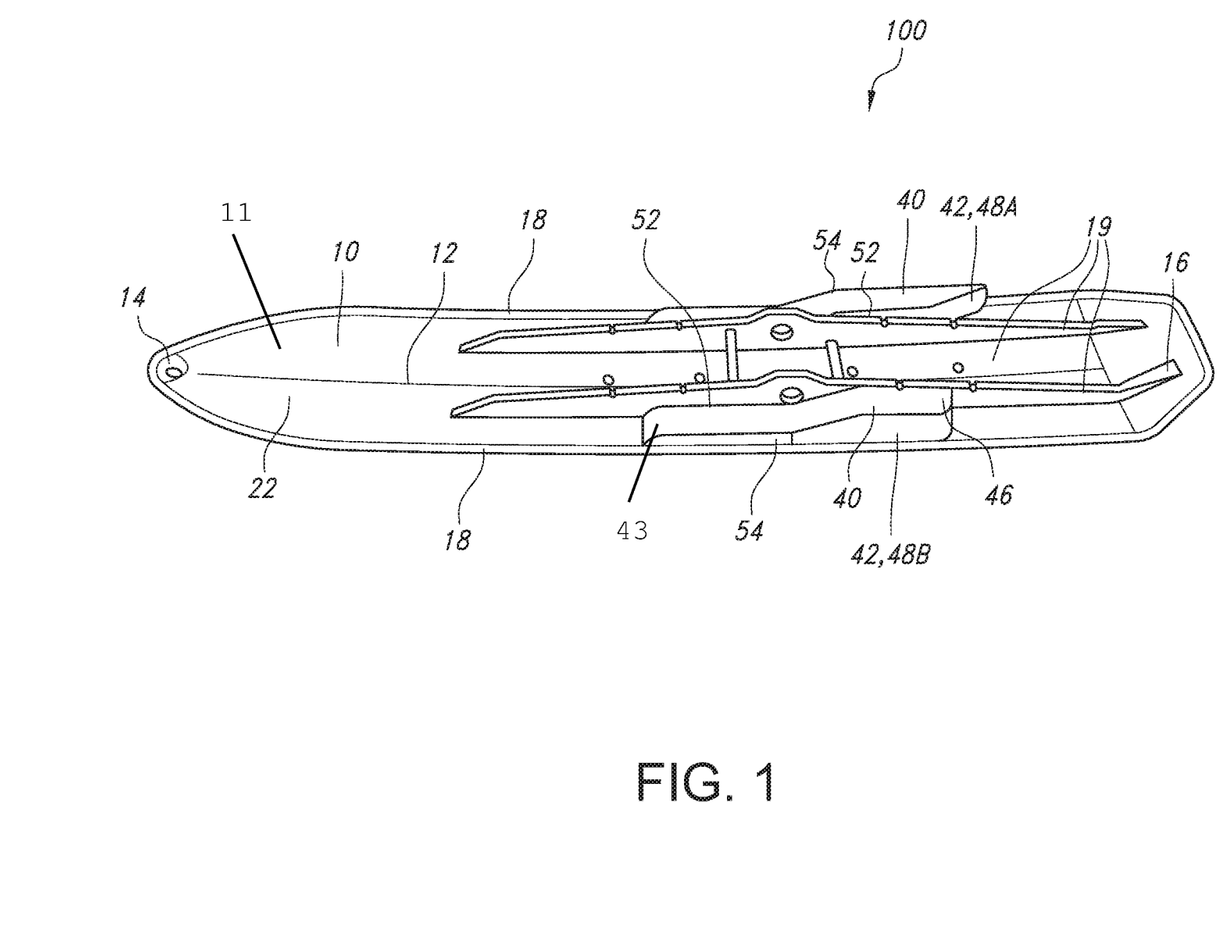
FIG. 1 is a top view of vented ski according to the invention having two vents.
Figure 2:
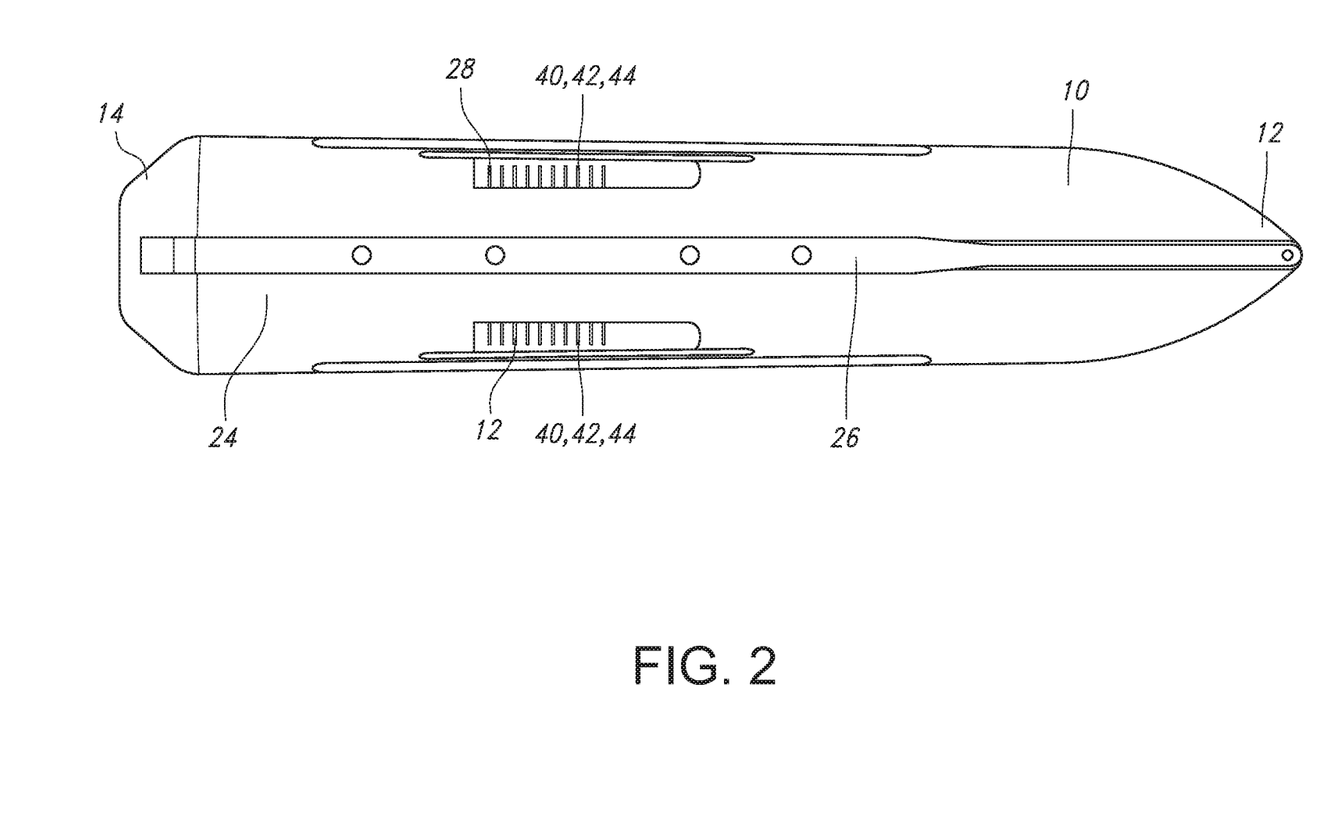
FIG. 2 is bottom view of the vented ski having two vents.
Figure 3:
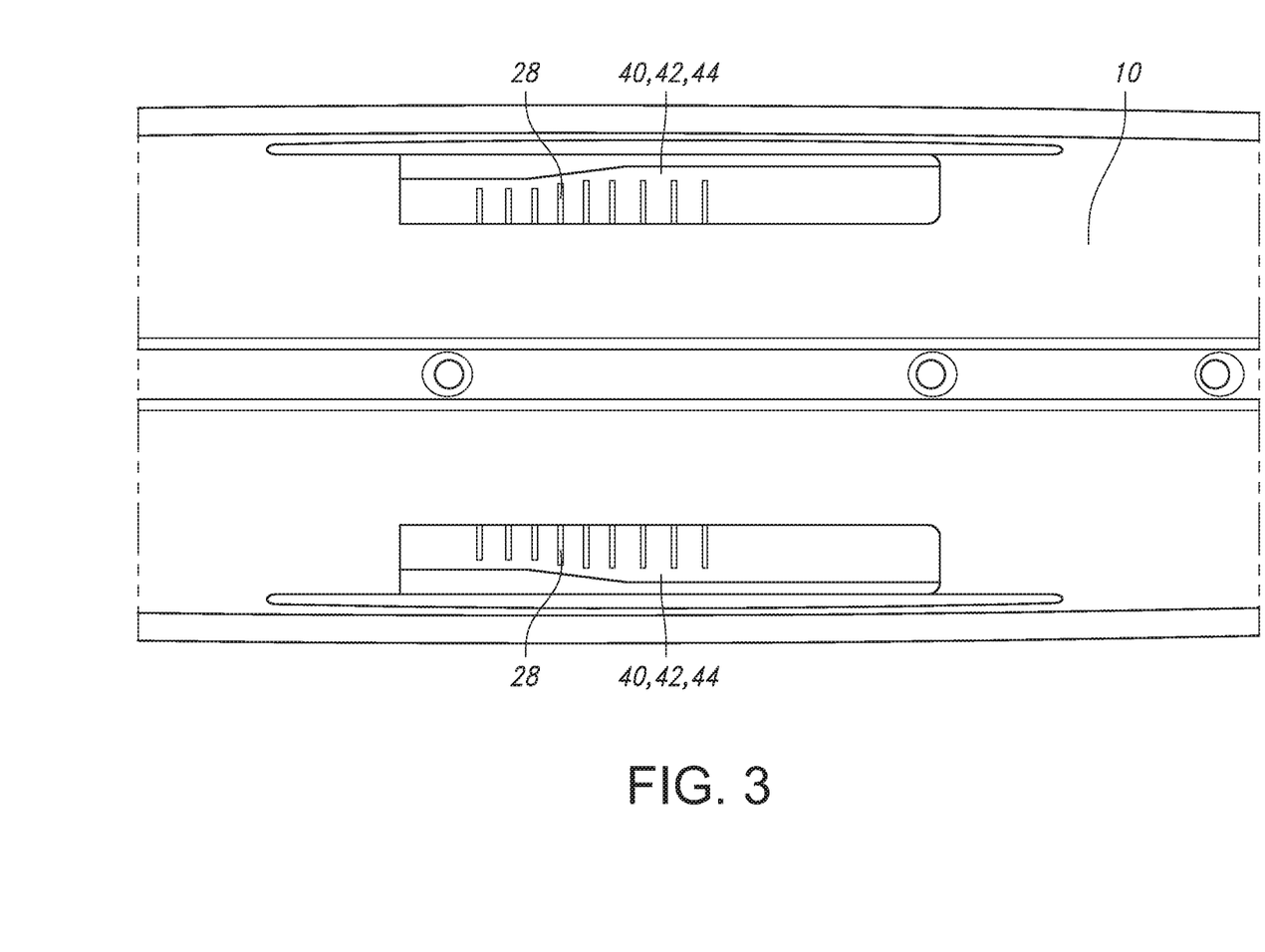
FIG. 3 is a bottom view of the vented ski showing the vents.

FIGS. 1-3 illustrate a vented ski 100 according to the invention, including a conventional ski 10 having at least one vent 40. When affixed to a ski-mounted vehicle such as a snowmobile (not shown), the skis 10 operate in the normal course, gliding across a snowy surface and allowing an operator to control the direction of the snowmobile. As the skis 10 glide along the surface, snow from beneath the skis 10 is vented through the vents 40 and out and away from a top surface 11 of the skis. In this manner, snow no longer becomes impacted beneath the ski 10 and the operator is able to maintain greater to control of the snowmobile. Additionally, depending on the design of the vents 40, it is possible that the vented snow may cool parts of the snowmobile. In the embodiment shown in FIGS. 1-10 the vents 40 are inserted into openings 28 in the ski 10, however, the vents 40 need not be inserted into the ski 10 and may alternatively be attached to the outer side of the ski 10 as shown in FIG.

Figure 11:
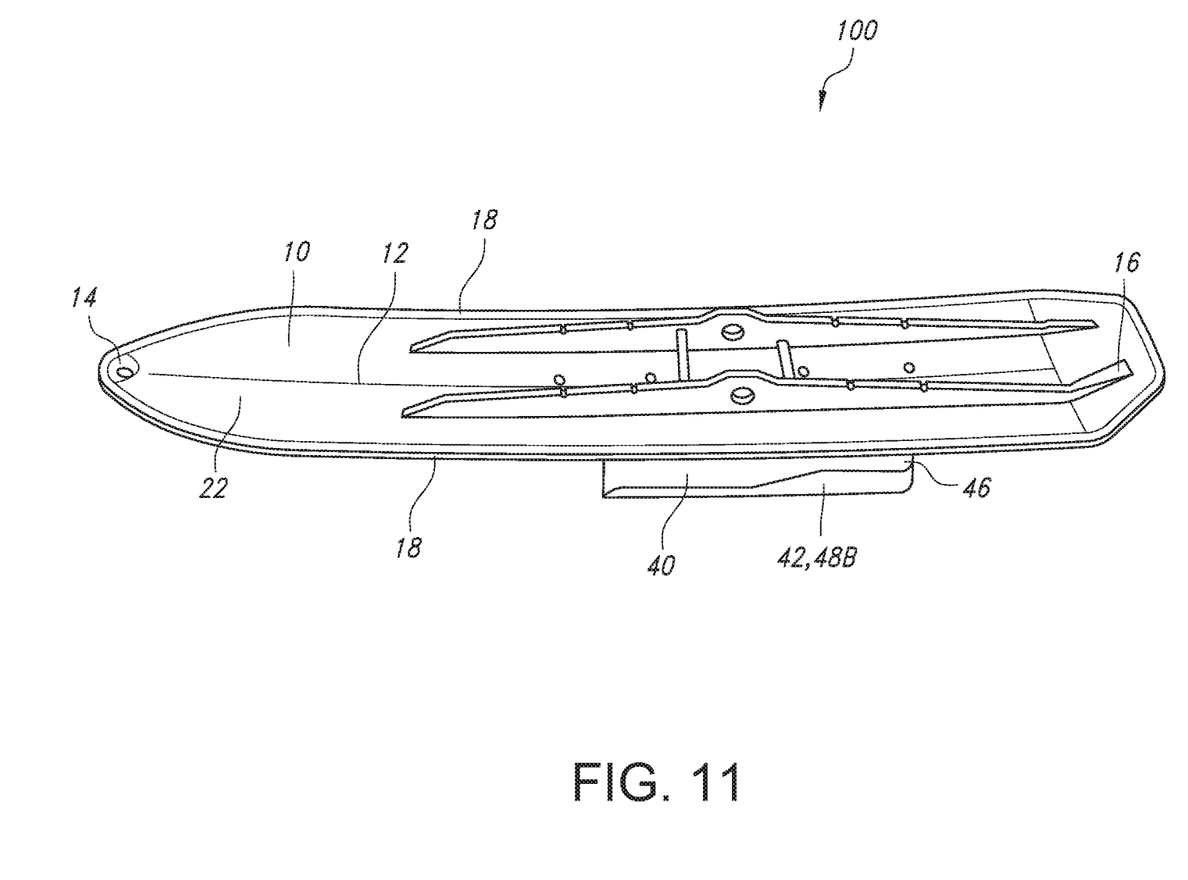
FIG. 11 is a top view of the ski having vent outside of the ski body.

11. The vents 40 may also be formed as an integral part of the ski, and/or formed as a part of the molded, stamped or pressed ski body.

The ski 10 has a ski body 12 that is a molded, pressed, or stamped component. The ski body 12 has a leading end 14 and a trailing end 16 and a bottom surface 24 that is the ski glide surface. A keel 26 typically extends along the center of the bottom surface running from the leading end 14 to the trailing end 16. The ski 10 also typically has a carbide runner or runners that run along a portion of the bottom surface 24 that, in addition to the keel 26, helps control the direction of the snowmobile. Often, the ski 10 also has two side walls 18 extending upward from a ski floor 22 and that provide structural support and may be used to secure the ski to the snowmobile. In addition, or in the alternative, a conventional shoe 19 or saddle may be affixed to the ski 10. The shoe or saddle is essentially an open channel that is affixed near the middle of the top surface of the ski 10, and may also be used to affix the ski 10 to the snowmobile. Whenever reference is made hereinafter to "front" or "rear" views of the various components and assemblies, "front" refers to the view facing the leading edge 14 and "rear" the view facing the trailing edge 16, when the component or assembly is incorporated into the ski 10.

In the embodiment shown in FIGS. 1-3, two vents 40 are inserted into openings 28 in the ski 10. As the vented ski 100 moves along the snow the loose snow that would otherwise become impacted beneath the ski, particularly in the corner that is created at the intersection of the keel 26 and bottom surface 24, enters the vents 40 through the openings 28 and is forced through the vents 40 by the movement of the snowmobile, exiting through the vent 40 above, out, and over the ski 10. Depending on the design of the ski 10, the vents 40 may be secured using conventional means, such as threaded fasteners, to the sidewalls 18 and/or the shoe 19.

Figure 4:
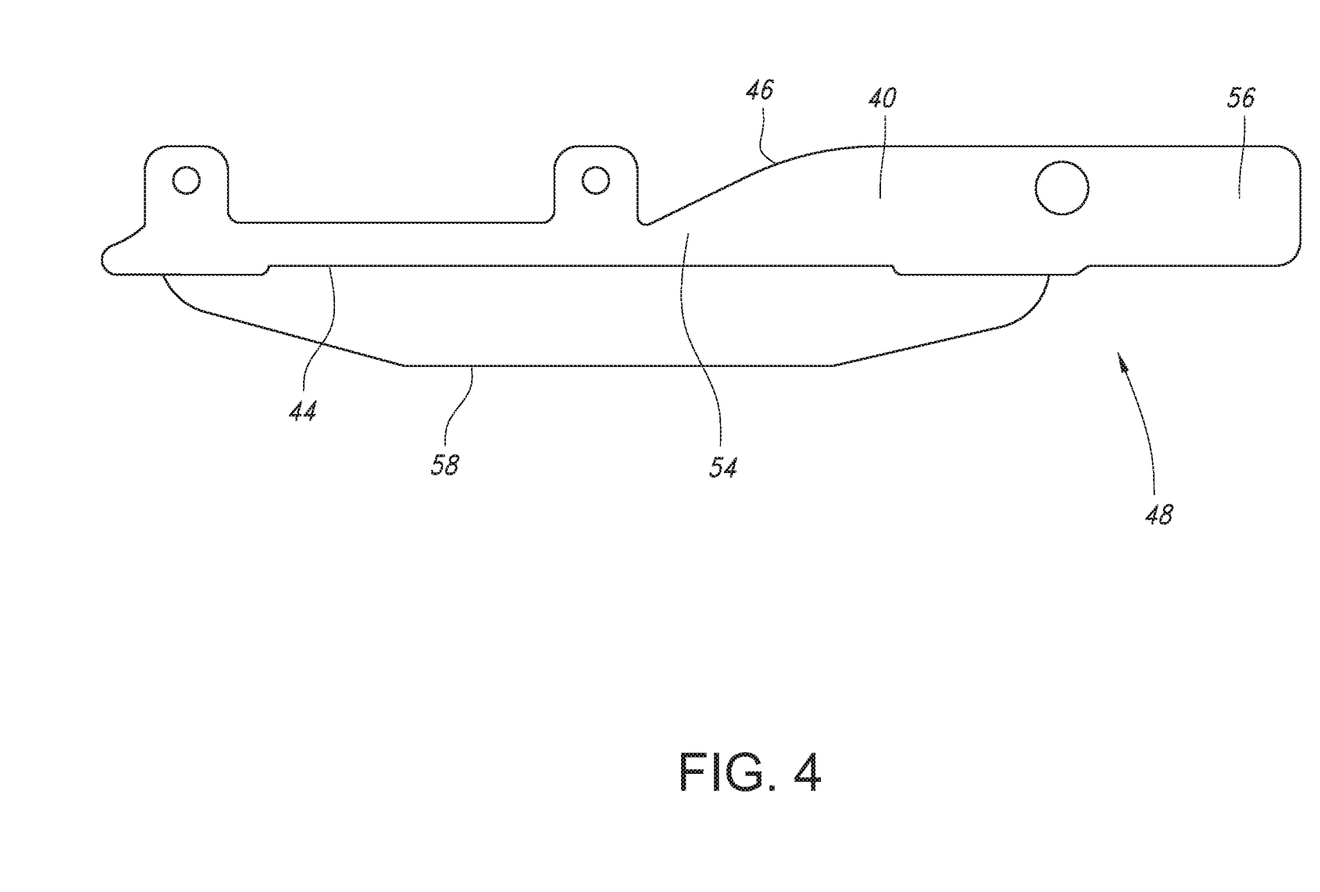
FIG. 4 is a side view of the vent showing the inner side.
Figure 5:
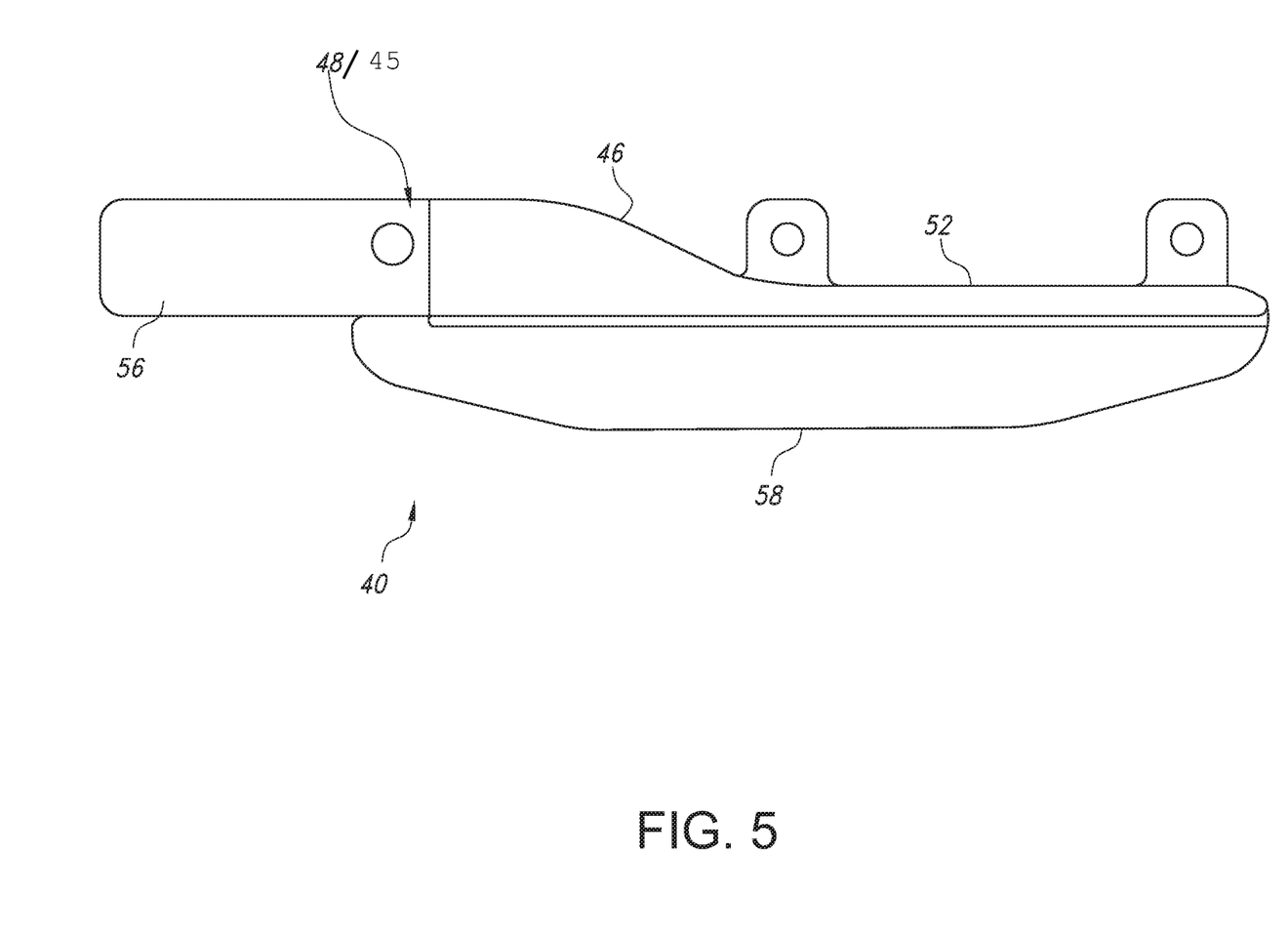
FIG. 5 is a side view of the vent showing the outer side.
Figure 6:
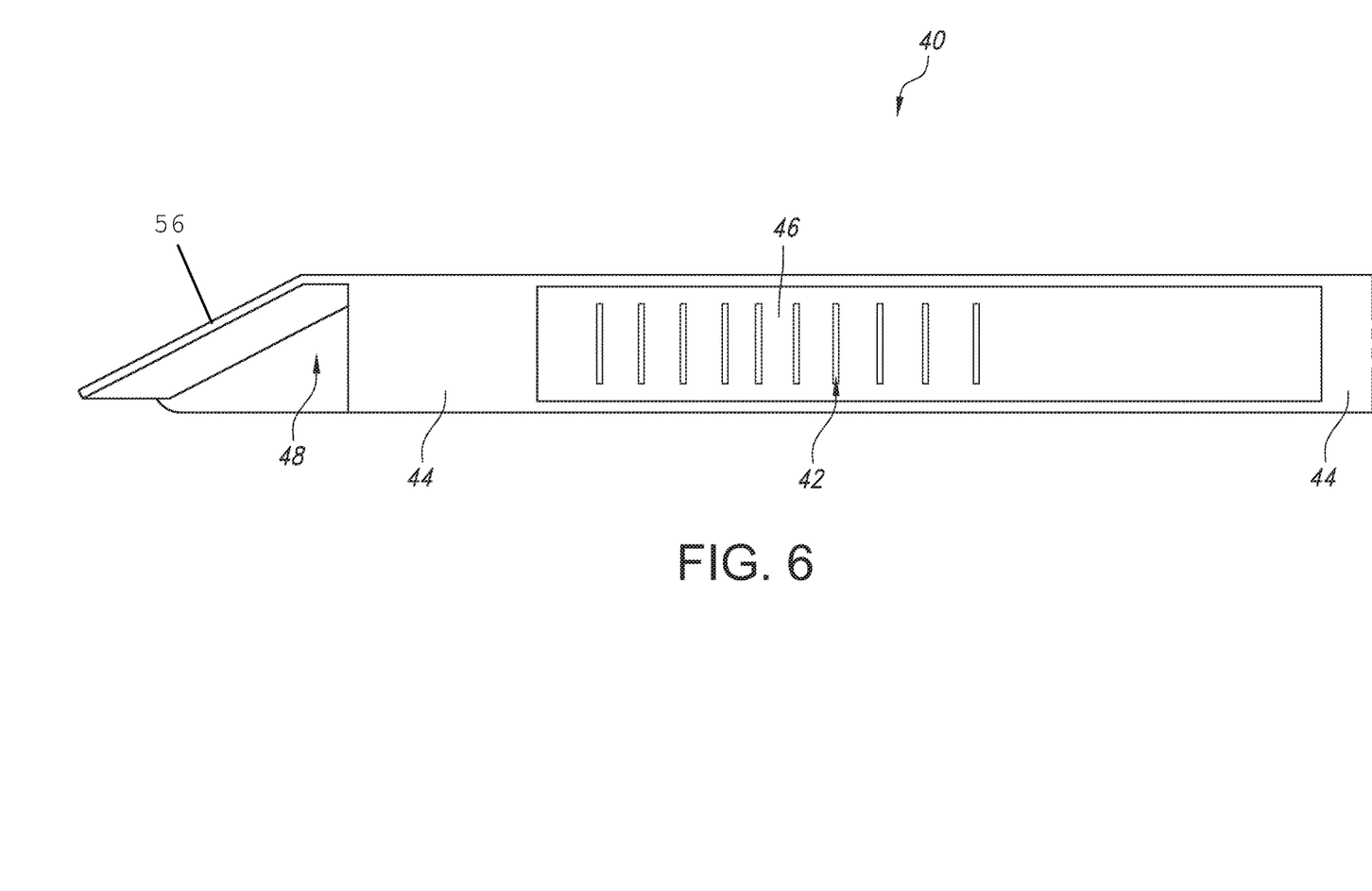
FIG. 6 is a bottom view of the vent.
Figure 7:
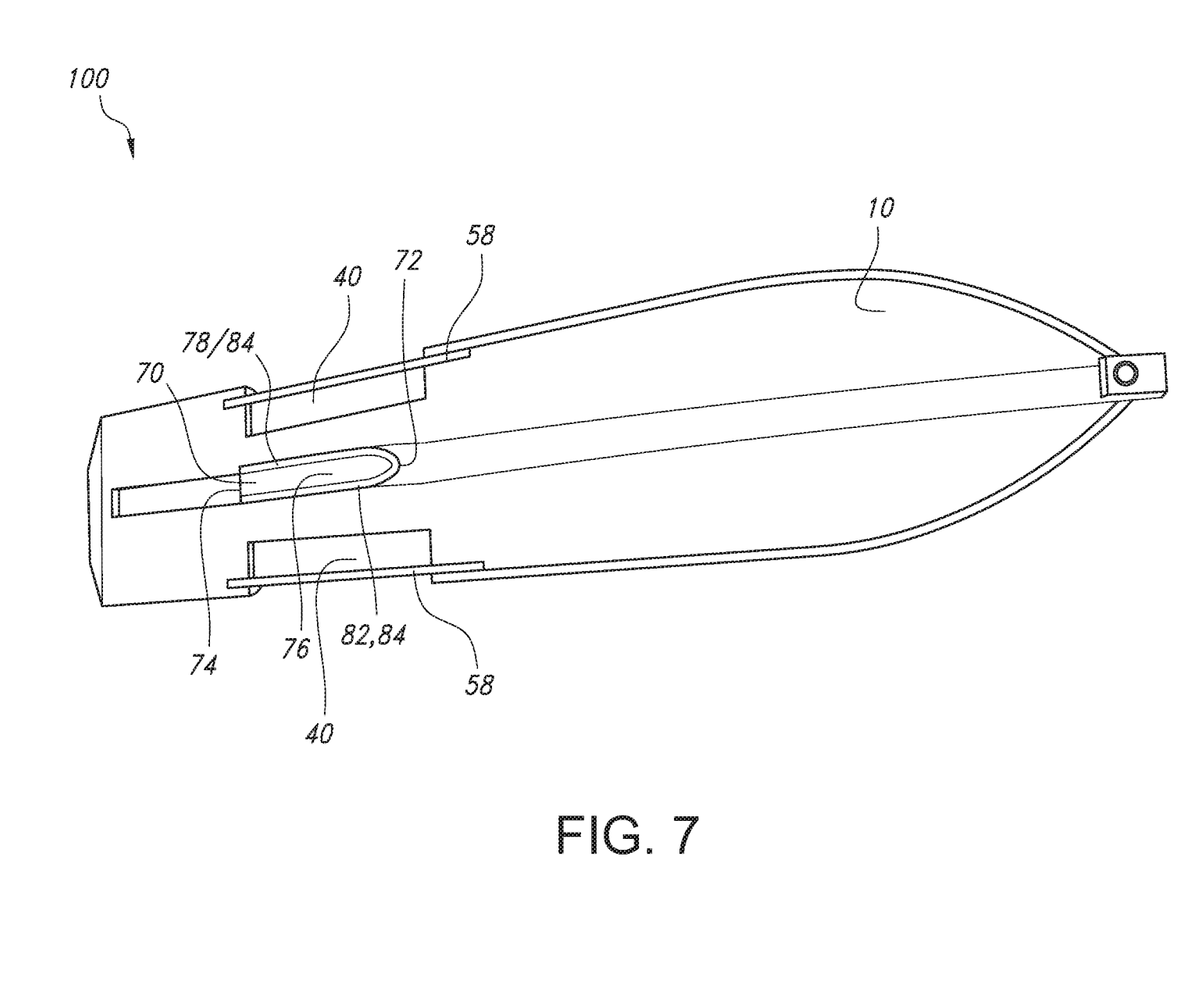
FIG. 7 is a bottom view of a vented ski having a modified keel.

FIGS. 4-6 illustrate the vents 40. The vents 40 have an approximately oblong shape with a top surface 46 and a bottom surface 44 that are connected by an inner sidewall 52 and an outsider sidewall 54. A front end 43 of the vent 40 is closed, and shaped in a curved aerodynamic manner. A back end 45 of the vent is at least partially open and serves as at least part of an exhaust vent 48. An opening 42 on the bottom surface 44 allows the snow to enter the vent 40 as the ski moves across the snow, and the closed top surface 46 guides the snow to the exhaust opening 48 on the vents 40. The inner sidewall 52 and the outer sidewall 54 are positioned on the inside of the ski 10 and the outside of the ski 10, respectively, and also help to direct snow to the exhaust opening 48.

The exhaust opening 48 may be positioned in a number of locations depending on the manner in which the designer wishes to have the snow exit the ski 10. In general, the vents 40 are constructed to either: a) divert snow out and away from the snowmobile; b) to direct snow inwards towards the snowmobiles track so as to use the snow to cool the track; or c) to direct snow away from each ski regardless of its effect on the snowmobile.

For example, as shown in FIG. 1, the exhaust opening 48A may be an opening in the inner sidewall 52 or the exhaust opening 48B may be in the outer sidewall. In the first instance the outer sidewall 54 is closed while in the second example the inner sidewall 52 is closed. Attaching this version of the ski 10 to the left side of the snowmobile causes it to direct snow away from the snowmobile, whereas attaching it to the right side causes it to direct snow towards the snowmobiles track. Using vents that are a mirror image of the vents shown in FIG. 1, and attaching that ski to the opposite side of a snowmobile, causes both skis to vent snow towards or away from the snowmobile as desired. Alternatively, a ski 10 may have two vents that each direct snow out and away from the ski so as to remove as much snow as possible from the ski.

In each case, the back end 45 of the vent 40 is open. Additionally, a vent 40 that is designed to direct snow towards the snowmobile track is likely short and small relative to the overall dimensions of the vent 40, thus causing the vented snow to be relatively concentrated such that it exits the vent 40 with a relatively high degree of speed and targeted towards the track. The exhaust vent 40 that is designed to send snow outside of the ski 10 is, conversely, relatively long with approximately one half of the outer sidewall 54 being open, as shown by 48B in FIG. 1, such that the snow pours out of the vent 40 as the ski 10 moves across the snowy surface.

In that regard, the sidewalls 52, 54 may be completely open to allow for a greater space for the vented snow to exit the vent 40, or the sidewalls 52, 54 may be partially closed to allow for greater control of the direction of the vented snow. For example, when it is preferable to control the direction of the vented snow, such as to direct snow under or into the snowmobile track to act as a cooling agent, having an opening that is mostly closed but curved to direct the snow towards the track may be preferable. To that end, a directional guide member 56, shown in FIGS. 4 and 6, may also be provided to further control the direction of the vented snow by guiding the vented snow to a particular spot, i.e. the track. The directional guide member 56 may also have a curved shape that causes the snow to exit the vent 40 in the shape of a vortex.

The outer side 54 of the vent 40 may also have a section 58 that extends beneath the bottom surface of the ski 10 as a blade or a fin. This blade 58 helps the directional control exerted by the ski as it moves along the snow and it also helps to funnel snow into the vent 40.

In the embodiment shown in FIGS. 1-3, the vents 40 are inserted into the openings 28 in the ski 10 and affixed to the shoe 19, however, they may also be affixed to the outer side of the ski 10, likely being attached to the sidewalls 18 and/or having fasteners that extend to the shoe 19, as shown in FIG. 11. The vents 40 may be provided as an add-on, such that they may be affixed to or inserted into an existing ski, or, alternatively, the vents may be incorporated as a manufactured component when the ski it is originally created.

Figure 8:
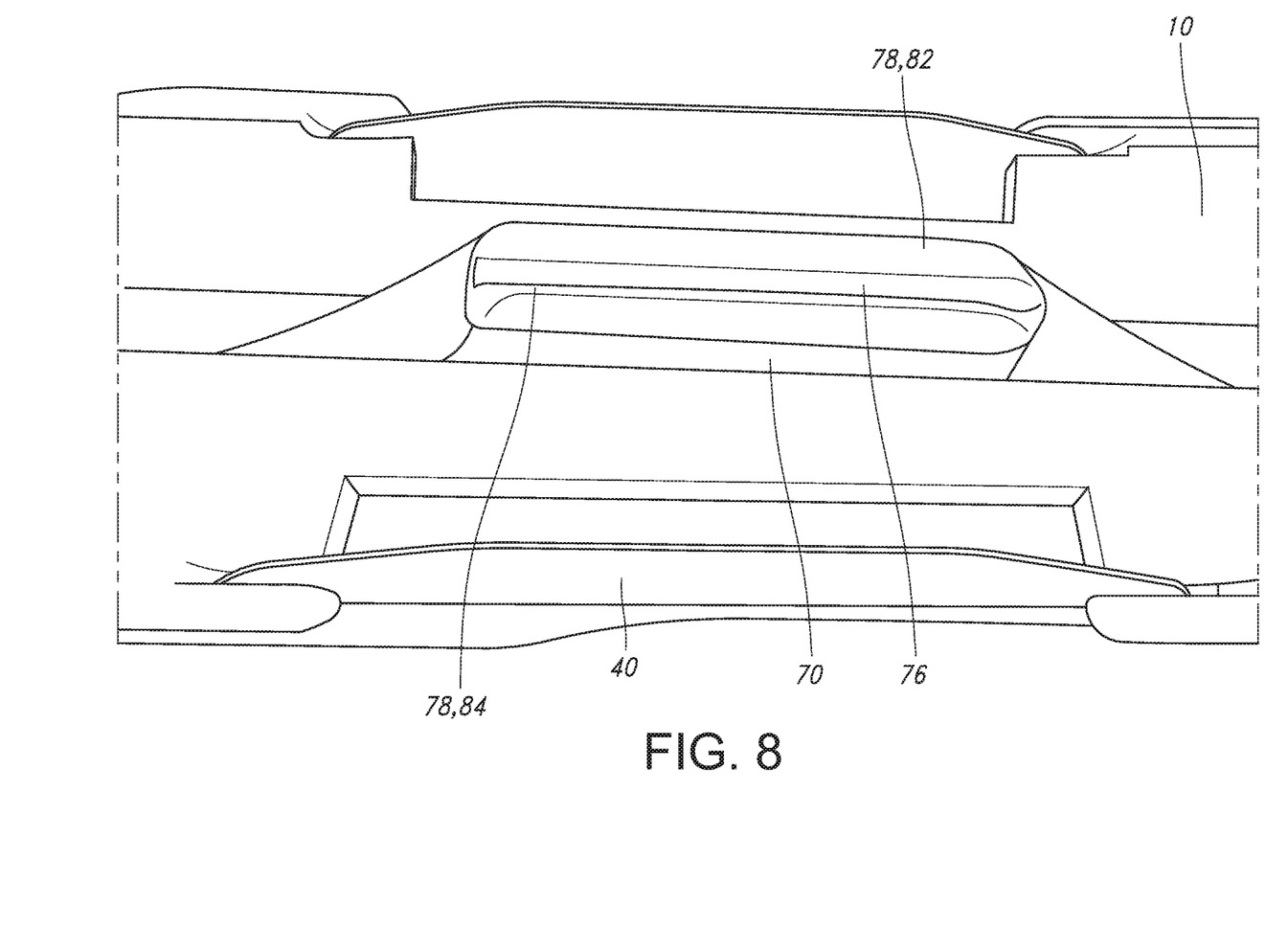
FIG. 8 is a bottom view of the vented ski showing the modified keel and the two vents.
Figure 9:
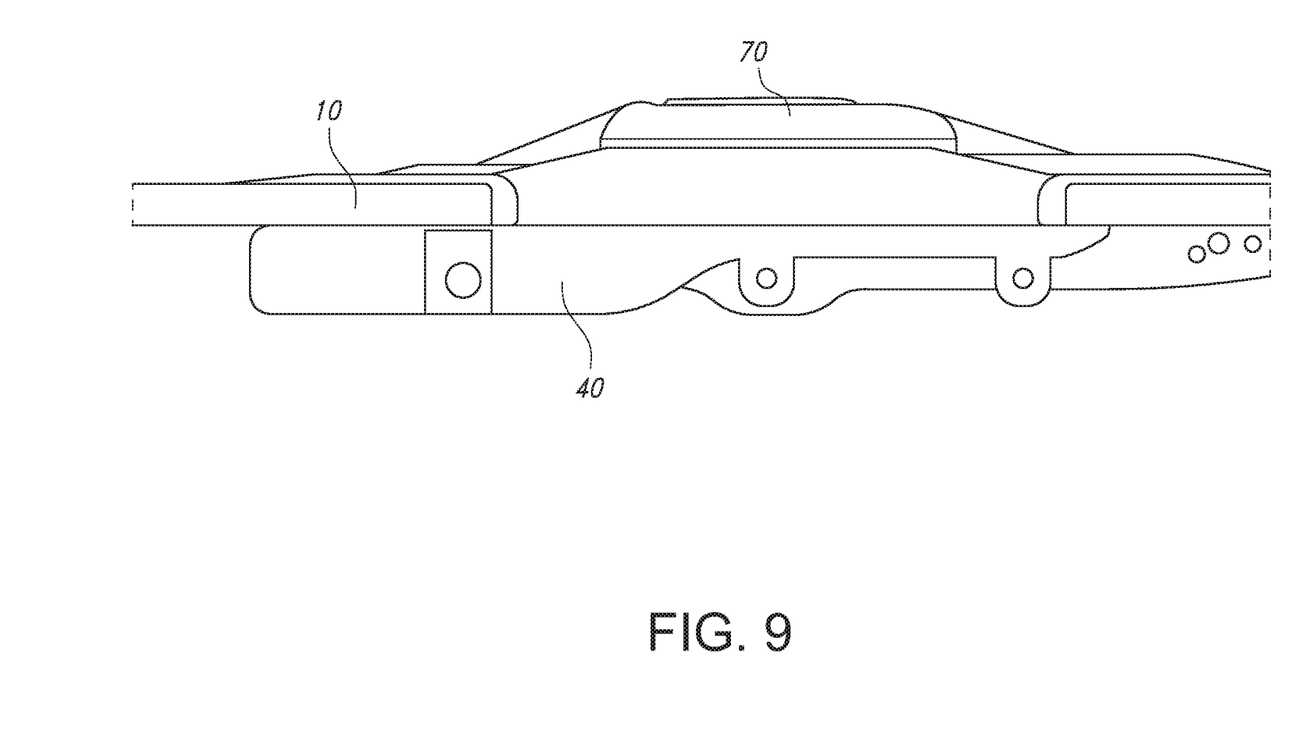
FIG. 9 is a side view of the ski with the modified keel and vents.
Figure 10:
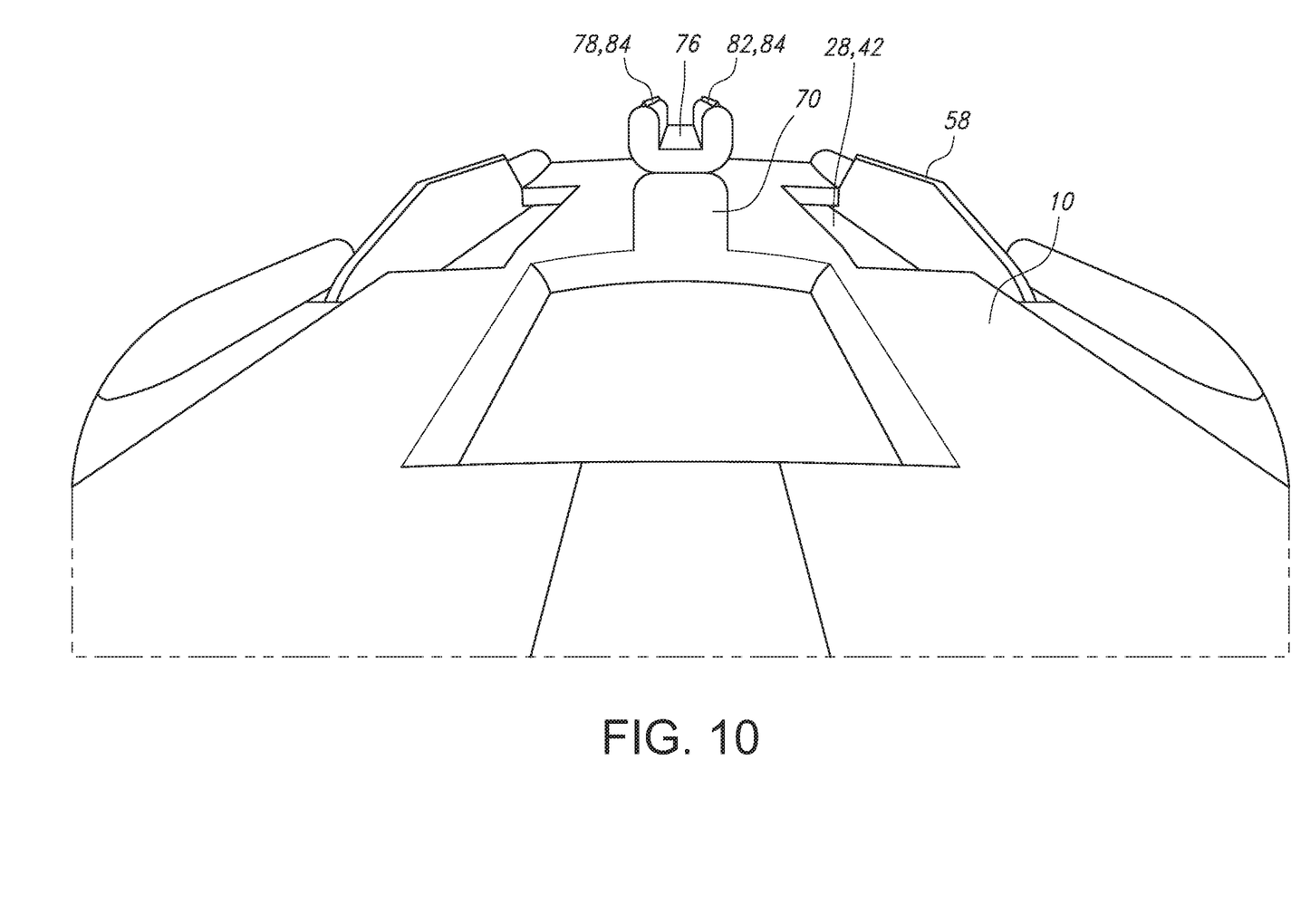
FIG. 10 is a front view of the ski with the modified keel and vents.

FIGS. 7-10 illustrate a modified ski keel 70. The modified keel 70 is significantly shorter than the conventional keel, and rather than running the length of the ski, or nearly the length of the ski, the modified keel 70 generally has a length that is less than one third the length of the entire ski and often less than one quarter of the length of the ski. For example, for a ski that has a length of approximately 45 inches, the modified keel has a length between approximately 6 inches and approximately 15 inches, preferably between 10 inches and 14 inches, and most preferably approximately 12 inches. The modified keel 70 may be slopped or tapered downward toward the ski on the front end 72 and back end 74, as shown in FIGS. 8 and 9.

For a modified keel 70 that is approximately 12 inches in lengths the non-tapered, flat, portion of the keel measures approximately 5 to 7 inches with slopes on either end of the keel that are approximately equal in length. The front end 72 of the keel 70 is angled inward, similar to the point of an arrow head. In most instances snowmobile skis have a kingpin that is used to attach the skis to the snowmobile's steering assembly (not shown). The modified keel 70 is approximately centered in the flat portion of the ski bottom, generally very near to the skis point of attachment to the kingpin. The modified keel 70 is also deeper than the traditional keel, in general having a depth between approximately 2 and approximately 4 inches. The width of the modified keel 70 is similar to the width of conventional ski keels, often around 1 inch.

The bottom of the keel 76 may be a single unitary piece, likely having a carbide runner on the bottom, or it may have two sides 78, 82, with a channel formed between them. In the embodiment shown, each side 78, 82, has a carbide runner 84. The carbide runner 84 may also be replaced by a piece of hardened steal.

The shortened length of the keel 70 causes the ski to be significantly easier to turn and manipulate despite the added depth of the keel, with the added depth still providing greater control. When used with the vents 40 the lower sections 58 on the vents 40 provide additional bite or grip on the snow so as to provide the operator with additional directional control of the snowmobile in spite of the modified keel 70.

It is understood that the embodiments described herein are merely illustrative of the present invention. Variations in the construction of the vented ski and modified keel may be contemplated by one skilled in the art without limiting the intended scope of the invention herein disclosed and as defined by the following claims.

What is claimed is:

1. A vent adapted for use in venting snow through a ski, the vent comprising:
   a top surface and a bottom surface that are connected to one another by an inner sidewall and an outer sidewall, a front end, and a back end that is at least partially open, the bottom surface having an opening that allows snow to enter the vent and an exhaust opening that allows snow to exit the vent; and
   wherein the vent is insertable in or attachable to the ski.

2. The vent of claim 1, further comprising a blade that extends beneath a bottom surface of the ski and provides greater directional control over the ski.

3. The vent of claim 1, wherein the exhaust vent is an opening in the back end of the vent and the front end is closed.

4. The vent of claim 1, wherein the exhaust vent is an opening in the inner side wall.

5. The vent of claim 1, wherein the exhaust vent is an opening in the outer side wall.

6. The vent of claim 1, further comprising a directional guide member affixed to either the inner sidewall or the outer sidewall.

7. A vented ski for a ski-mounted vehicle that vents snow from a ground surface as the ski-mounted vehicle travels along the ground surface, the vented ski comprising:
   a ski body having a leading end, a trailing end, a top ski surface and a bottom ski surface that is a glide surface;
   one or more vents, each vent having a top surface and a bottom surface that are connected to one another by an inner sidewall and an outer sidewall, a front end, and a back end that is at least partially open, the bottom surface having an opening that allows snow to enter the vent and an exhaust opening that allows snow to exit the vent; and
   wherein each of the one or more vents is inserted into or attached to the ski.

8. The vented ski of claim 7, wherein at least one of the one or more vents is affixed to the outside of the ski body.

9. The vented ski of claim 7, further comprising the ski body having one or more openings, and wherein each of the one or more vents is positioned within each of the one or more openings.

10. The vented ski of claim 9, wherein at least a portion of the exhaust opening is in the outer sidewall so as to cause snow to exits the vented ski to exit in a direction away from the ski-mounted vehicle.

11. The vented ski of claim 9, wherein at least a portion of the exhaust opening is in the inner sidewall so as to cause snow that exits the vented ski to exit in a direction towards a track on the ski-mounted vehicle.

12. The vented ski of claim 9, further including a keel that has a length that is less than approximately 30% of the length of the ski body.

13. The vented ski of claim 9, further including a keel that has a length that is less than approximately 20% of the length of the ski body.

14. The vented ski of claim 9, further including a keel that has a length that is between approximately 6 inches and approximately 14 inches in length and that has a depth of between approximately 2 inches and approximately 4 inches.

15. The vented ski of claim 9, wherein each of the one or more vents has a blade that extends beneath a bottom surface of the ski body.

* * * * *